March 10, 1970 J. W. HUDSON Re. 26,814

BUILDING FLOOR CONSTRUCTION AND UNDERFLOOR WIRING DUCT SYSTEM

Original Filed March 4, 1963 2 Sheets-Sheet 1

INVENTOR.
James W. Hudson

By: Paul J. Rose
Atty.

BUILDING FLOOR CONSTRUCTION AND UNDERFLOOR WIRING DUCT SYSTEM

Original Filed March 4, 1963 2 Sheets-Sheet 2

INVENTOR.
James W. Hudson

By: Paul J. Rose
Atty.

United States Patent Office

Re. 26,814
Reissued Mar. 10, 1970

26,814
BUILDING FLOOR CONSTRUCTION AND UNDERFLOOR WIRING DUCT SYSTEM

James W. Hudson, Lexington, Ky., assignor to Square D Company, Park Ridge, Ill., a corporation of Michigan Original No. 3,264,791, dated Aug. 9, 1966, Ser. No. 262,445, Mar. 4, 1963. Application for reissue Sept. 5, 1968, Ser. No. 760,393
Int. Cl. E04b *5/48*
U.S. Cl. 52—221 5 Claims

Matter enclosed in heavy brackets [ ] appears in the original patent but forms no part of this reissue specification; matter printed in italics indicates the additions made by reissue.

*ABSTRACT OF THE DISCLOSURE*

*Groups of parallel distribution duct runs extending in one direction at an upper level are spaced successively farther from a housing, and a plurality of parallel feed duct runs extending in a transverse direction at a lower level extend successively farther from the housing, one feed duct run being connected to each group of distribution duct runs. An embedding concrete floor may have two different thicknesses, being thicker in the regions of the feed duct runs.*

Figure 2:
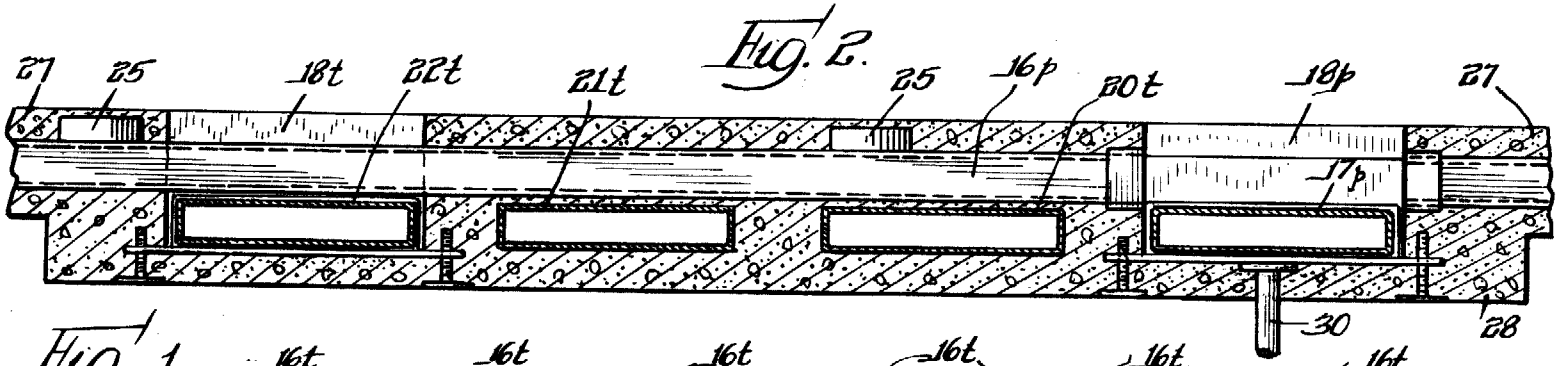

This invention relates to the construction of an above-grade concrete floor and to an underfloor duct system embedded therein for housing wiring for telephones and electric power.

Multi-story buildings formerly were built with load-bearing exterior walls and many load-bearing interior walls. Since the load-bearing capacity of such structures was very high, floor weight was not of primary concern, and the above-grade floors were relatively thick slabs of concrete. Underfloor wiring duct systems were easily embedded in the thick slabs.

Many newer buildings are supported by interior columns to permit the use of exterior curtain walls and the elimination of load-bearing interior walls. Weight has thus become a more important factor, and the concrete slabs of upper floors have been made thinner. At the same time, increased lighting requirements and greatly expanded use of telephones and electrically powered office equipment have brought a demand for more underfloor wiring raceways in the thinner concrete floors.

Cellular steel floors have been used to meet this demand. However, many architects and engineers prefer floors of reinforced concrete instead of cellular steel floors because of the inherent resistance to fire, better acoustical properties, greater local availability, lower cost, and increased stability of reinforced concrete. Prior to the present invention, architects and engineers who preferred reinforced concrete floors met the demand for more wiring raceways in the thinner concrete slabs by using a complete grid of junction boxes and single level underfloor wiring duct throughout the entire area, the junction boxes being spaced apart from each other in parallel spaced rows and cross-connected in mesh fashion by wiring duct all at a single level for accommodation in a thin concrete floor slab.

Such an underfloor duct system is not only very expensive, but has inadequate wire carrying capacity in certain portions. Inadequate wire carrying capacity occurs because a junction box in a run of distribution duct nearest a wire distribution center must accommodate not only the wires for that run, but also the wires for the run of distribution duct farthest from the wire distribution center and those for all intervening runs.

The present invention overcomes this problem by providing an underfloor duct system comprising a plurality of relatively closely spaced parallel feed duct runs connected to a housing for a wire distribution center and extending transversely of and underneath a plurality of more widely spaced distribution duct runs, the feed duct runs extending successively farther from the housing and each feed duct run being connected to a respective group of successively spaced distribution duct runs, the respective groups of distribution duct runs being spaced successively farther from the housing in correspondence with the successively farther extent of the feed duct runs. This results in a pyrimidal effect and hence the duct system of this invention can be termed a pyramidal feed system.

The present invention involves the foregoing pyramidal arrangement of feed duct runs at one level and distribution duct runs at another level, together with a concrete floor construction wherein most of the floor is of a thickness sufficient to encase the distribution duct runs and the upper portions of the junction boxes but not sufficient to encase the feed duct runs and the lower portions of the junction boxes, and relatively narrow and widely spaced dropped concrete beams depend from the rest of the floor solely for providing sufficient thickness to encase the feed duct runs and the lower portions of the junction boxes. The additional thickness of concrete necessary to form the relatively narrow and widely spaced feeding beams which enclose the feed duct runs and the lower portions of the junction boxes does not significantly increase the load required to be supported by the interior columns of a building.

An object of the invention is to provide an improved underfloor wiring duct system.

Another object is to provide an improved concrete floor construction and underfloor wiring duct system for the above-grade floors of a multi-story building.

Figure 1:
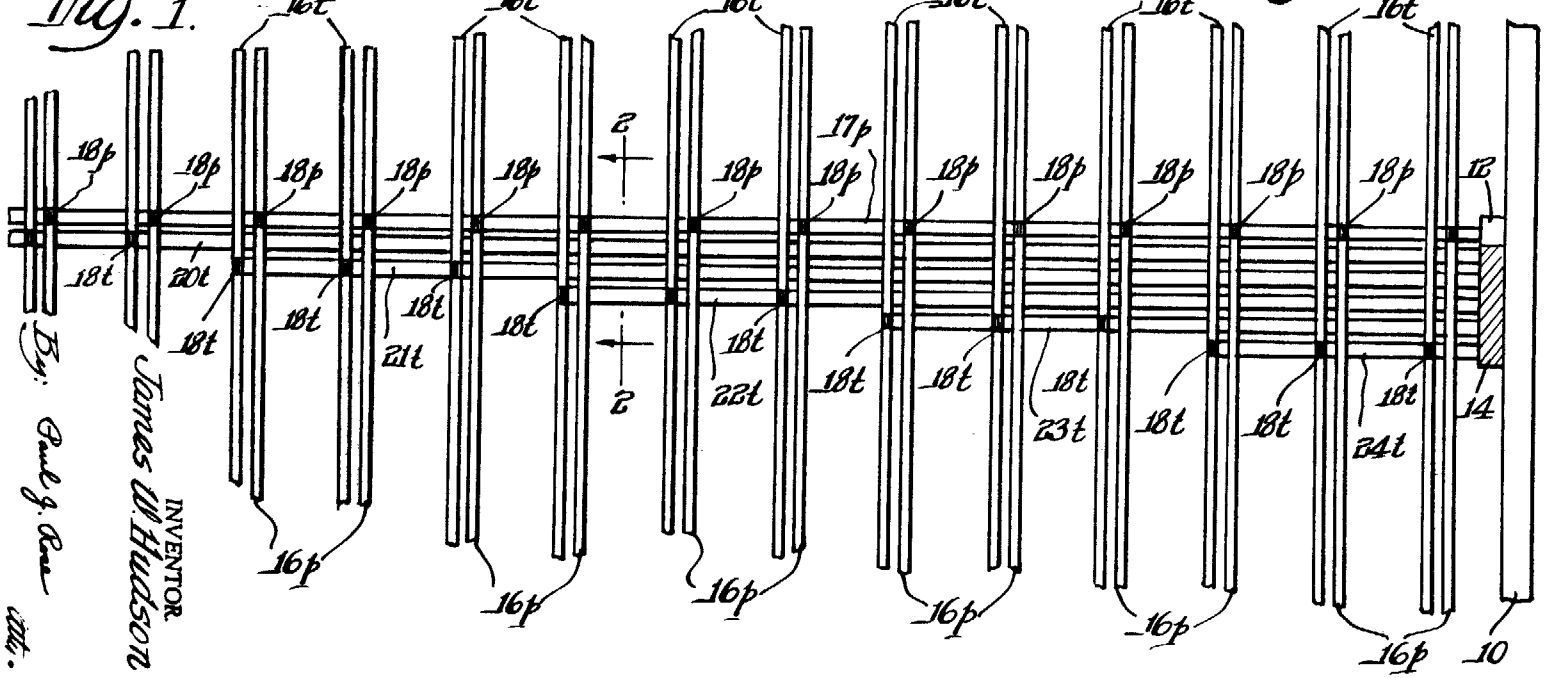
Figure 3:
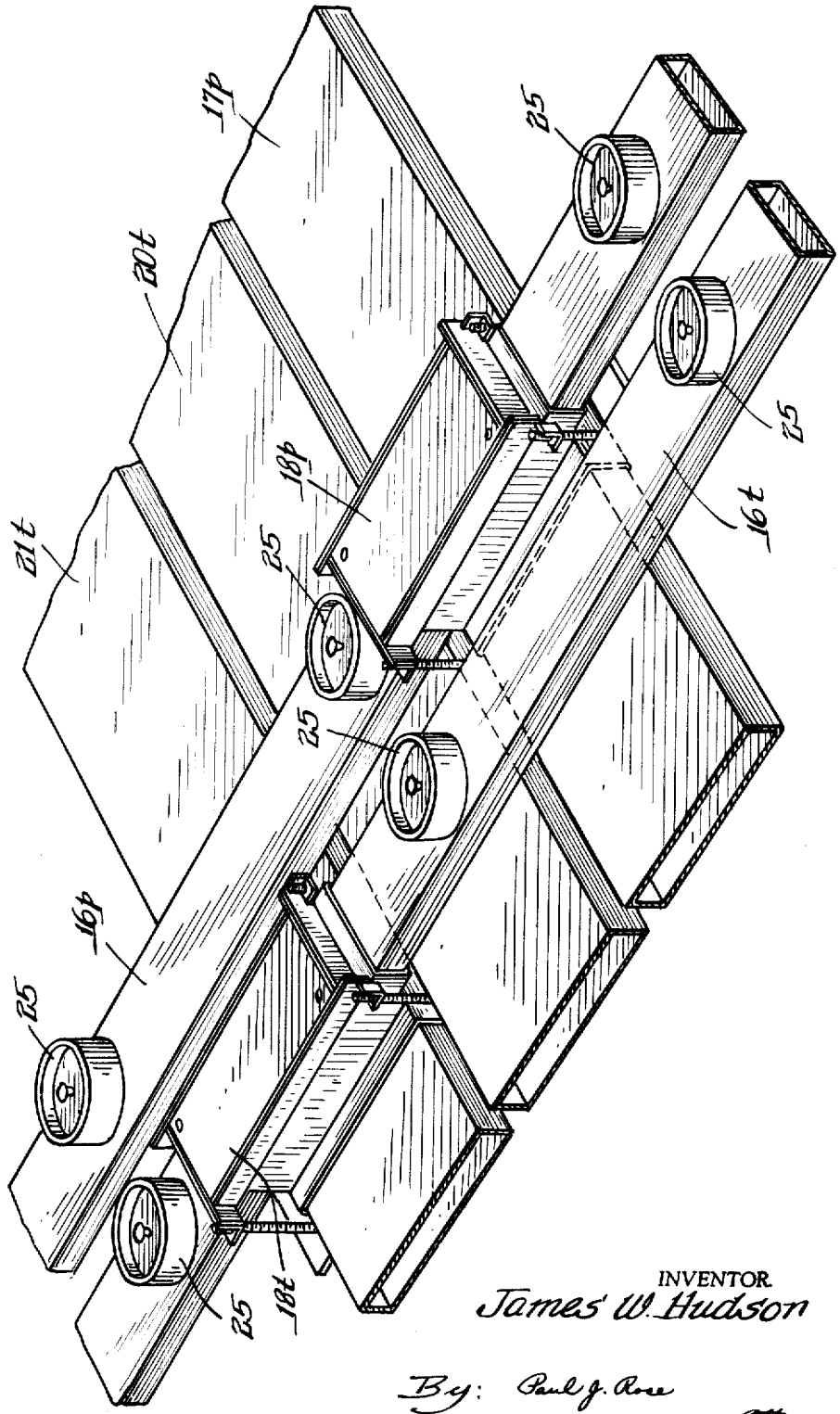

These and other objects will become apparent when the following specification is considered along with the accompanying drawings in which:

FIGURE 1 is a plan view of a portion of an underfloor duct system constructed in accordance with this invention, showing the duct before the pouring of a concrete floor thereover and schematically illustrating the junction boxes by solid black areas;

FIGURE 2 is a sectional view of a portion of a concrete floor having an underfloor duct system constructed in accordance with this invention embedded therein, the section through the underfloor duct system being taken substantially along the line 2—2 of FIGURE 1 and enlarged from the scale of FIGURE 1 though still smaller than actual size; and FIGURE 3 is a perspective view of a portion of an underfloor duct system constructed in accordance with this invention.

FIGURE 1 represents a portion of an underfloor duct system for an above-grade floor of a multi-story building having an outer wall 10. A housing or cabinet 12 for a distribution center for electric power supply wires and a housing or cabinet 14 for a distribution center for telephone service wires are provided adjacent the wall 10. Extending parallel to the wall 10 on a first upper level are a plurality of pairs of runs of distribution duct. The two distribution duct runs of each pair are relatively closely spaced and the pairs of distribution duct runs are relatively widely spaced. A duct run 16p of each pair of distribution duct runs houses electric power supply wires and a duct run 16t of each pair houses telephone service wires. The electric power supply wire distribution duct runs 16p are connected with the cabinet 12 by a feed duct run 17p extending on a second lower level underneath and transversely of the distribution duct runs 16p on the first upper level and connected to the distribution duct runs 16p respectively by a plurality of junction boxes 18p. The telephone service wire distribution duct runs 16t are connected with the cabinet 14 by an arrangement of feed duct runs which comprises the pyramidal feed system of my invention.

Because of the probable eventual use of a large number of telephones in a building, and the possible use of special telephones having extremely complex circuitry and requiring an unspliced cable approximately one inch in diameter for each telephone, a plurality of parallel feed duct runs 20t, 21t, 22t, 23t, 24t extending from the cabinet 14 and spaced as closely together as practicable is provided. In the example shown, each of the feed duct runs 20t–24t extends on the second lower level underneath and transversely of the distribution duct runs 16t on the first upper level and is connected to a group of three successive junction boxes 18t respectively connected to three of the distribution duct runs 16t, and the several groups of three junction boxes 18t are located successively farther from the cabinet 14, resulting in a pyramidal effect. It will be seen that telephone wires from each group of three junction boxes can be run directly to the cabinet 14 without going through any intervening junction boxes in other groups and having other wires therein, and thus the wire carrying capacity is greatly increased and the job of fishing wires through the duct system is greatly facilitated.

It will be understood that the building has another exterior wall opposite the wall 10, that the pairs 16p and 16t of the distribution duct runs are spaced uniformly across the floor between the wall 10 and the opposite wall, and that a pyramidal feed arrangement symmetrical to that just described with respect to the feed duct runs 20t–24t and groups of junction boxes 18t may be provided to extend from another telephone cabinet opposite the cabinet 14, and that the feed duct run 17p may extend across the floor to another electrical cabinet opposite the cabinet 12 and connect to other junction boxes 18p in addition to those shown. The pyramidal feed arrangement is normally provided only for the telephone service wires, a single duct run such as 17p connected to all the junction boxes 18p extending across a floor normally furnishing adequate wire carrying capacity for all the electric power supply wires in a particular floor area. However, it is obvious that there could be a plurality of feed duct runs for electric power supply wires arranged in a pyramidal feed system similar to that of the feed duct runs 20t–24t.

Because the feed duct runs 17p and 20t–24t extend under the distribution duct runs 16 and 16t, the concrete floor must be thick enough to enclose two levels of duct. However, if the whole floor were made thick enough to enclose two levels of duct, the load required to be carried by the interior columns would be too great. To solve this problem, feeding beams are provided in accordance with this invention as a complement to the above-described pyramidal feed underfloor duct system.

Because of the arrangement of separate groups of only three junction boxes 18t with each group having a separate feed duct run from the cabinet 14, telephone service wires from an area extending a considerable distance on opposite sides of the feed duct runs 20t–24t can be accommodated. Thus if a floor extends several hundred feet in the direction of the distribution duct runs 16p and 16t, a plurality of sets of cabinets 12 and 14 may be provided along each of a pair of opposite outer walls of a building and the sets may be spaced a considerable distance apart, and corresponding sets of feed duct runs 17p and 20t–24t may also be spaced a considerable distance (for example, approximately fifty feet) apart. Between the sets of feed duct runs 17p and 20t–24t and thus for the materially greater portion of the floor area the concrete floor may be made of a thickness sufficient to enclose only the distribution duct runs 16p and 16t.

The feed duct runs 17p and 24t–24t are formed of blank duct, and the distribution duct runs 16p and 16t are formed of duct having access inserts 25 spaced uniformly along the top thereof, as shown in FIGS. 2 and 3. The thickness of the greater portion of the floor area may be as indicated at the portions 27 at opposite ends of the floor section shown in FIG. 2. At widely spaced intervals, small portions of the floor may be made thicker by the provision of transversely-extending, dropped feeding beams 28 solely for enclosing the feed duct runs 17p and 20t–24t and the lower portions of the junction boxes 18p and 18t. Because of the pyramidal feed arrangement of this invention, the feeding beams 28 may be widely spaced, and their additional weight added to the weight of a floor entirely of the thickness of the portions 27 is a relatively insignificant increase in the load required to be supported by the interior columns of a building. By way of example, the thickness of the portions 27 of a floor may be three inches, while the total thickness in the sections having the additional dropped feeding beams 28 may be five inches. Further, various of the junction boxes 18p may have a conduit such as a conduit 30 as shown in FIG. 2 extending downwardly therefrom for housing electric power supply wires for ceiling lights in rooms below the particular floor.

It should be noted that each junction box 18p contains only the relatively high voltage electric power supply wires, and that each junction box 18t contains only telephone and other low voltage wires.

Various modifications may be made in the structure disclosed without departing from the spirit and scope of the invention.

What is claimed is:

1. An underfloor wiring duct system for distributing electrical service wires from a housing, said underfloor wiring duct system comprising (a) a plurality of parallel electrical wiring feed duct runs of different lengths connected to the housing and extending different distances therefrom at a first level, (b) a corresponding plurality of groups of electrical wiring distribution duct runs extending transversely of said feed duct runs at a second level, each of said distribution duct runs having a plurality of access openings spaced longitudinally therealong for distributing electrical service wires to floor outlets, all the distribution duct runs of any group being spaced farther from the housing than the distance any of the distribution duct runs of a group closer to the housing is spaced from the housing, each feed duct run being connected to each distribution duct run of a respective one of said groups of distribution duct runs, and each feed duct run being connected to only those distribution duct runs of its respective group.

2. An underfloor wiring duct system as claimed in claim 1, wherein said feed duct runs are disposed beneath said distribution duct runs at the lower of said first and second levels.

3. The combination of a concrete floor for an above-grade floor of a multi-story building and an underfloor wiring duct system embedded therein for distributing electrical service wires from a housing, said combination comprising (a) a plurality of parallel electrical wiring feed duct runs of different lengths connected to the housing and extending different distances therefrom at a lower first level, (b) a corresponding plurality of groups of electrical wiring distribution duct runs extending transversely of said feed duct runs at an upper second level, each of said distribution duct runs having a plurality of access openings spaced longitudinally therealong for distributing electrical service wires to floor outlets, all the distribution duct runs of any group being spaced farther from the housing than the distance any of the distribution duct runs of a group closer to the housing is spaced from the housing, each feed duct run being connected to each distribution duct run of a respective one of said groups of distribution duct runs, and each feed duct run being connected to only those distribution duct runs of its respective group, (c) a concrete floor encasing said distribution duct runs and having a thickness such as to leave said feed duct runs exposed, and (d) a dropped concrete beam depending integrally from said concrete floor and covering the exposed portions of said feed duct runs.

4. A combination concrete floor and underfloor wiring duct system as claimed in claim 3, wherein said distribution duct runs are relatively long and a plurality of sets of feed duct runs and dropped concrete beams are provided and spaced relatively far apart longitudinally of said distribution duct runs.

*5. An underfloor wiring duct system for distributing electrical service wires from a housing, said underfloor wiring duct system comprising*

*(a) a plurality of parallel electrical wiring feed duct runs of different lengths connected to the housing and extending different distances therefrom at a lower level, each of said feed duct runs having a generally rectangular cross section defined by two pairs of opposed wall portions integral with each other but non-integral with the wall portions of any other of said feed duct runs,*

*(b) a plurality of groups of parallel electrical wiring distribution duct runs extending transversely of said feed duct runs at an upper level, each of said distribution duct runs having a generally rectangular cross section defined by two pairs of opposed wall portions integral with each other but non-integral with the wall portions of any other of said distribution duct runs, one of the wall portions of each of said distribution duct runs being an upper wall portion having a plurality of access openings therein*

*prior to the arrangement of the distribution duct run into said system, the access openings being spaced equidistantly longitudinally along the distribution duct run for distributing electrical service wires to floor outlets, each of the distribution duct runs of any of said groups being spaced farther from the housing than the distance any of the distribution duct runs of a group closer to the housing is spaced from the housing, and*

*(c) a plurality of groups of two-level junction boxes, each of said feed duct runs being connected to the distribution duct runs of a respective one of said groups of distribution duct runs by the junction boxes of one of said groups of junction boxes and being connected to only those distribution duct runs of its respective group.*

References Cited

The following references, cited by the Examiner, are of record in the patented file of this patent or the original patent.

UNITED STATES PATENTS

| | | | |
|---|---|---|---|
| 2,691,291 | 10/1954 | Henderson | 52—236 |
| 2,729,429 | 1/1956 | Goemann | 52—221 X |
| 2,824,578 | 2/1958 | Blinn et al. | 52—221 X |
| 2,944,478 | 7/1960 | Curran | 52—221 X |
| 2,946,413 | 7/1960 | Wiesmann | 189—36 |
| 2,975,559 | 3/1961 | Hedgren | 52—98 |

FOREIGN PATENTS

| | | |
|---|---|---|
| 674,711 | 6/1952 | Great Britain. |

FRANK L. ABBOTT, Primary Examiner

J. L. RIDGILL, Jr., Assistant Examiner